April 25, 1972     L. J. BERNARDIN     3,658,790
ABSORBENT FIBER PRODUCTS FROM PHOSPHORYLATED CELLULOSE
FIBERS AND PROCESS THEREFOR
Filed April 22 1970     5 Sheets-Sheet 5

CAPILLARY SUCTION PRESSURE MEASURING APPARATUS

United States Patent Office 3,658,790
Patented Apr. 25, 1972

3,658,790
ABSORBENT FIBER PRODUCTS FROM PHOSPHORYLATED CELLULOSE FIBERS AND PROCESS THEREFOR
Leo J. Bernardin, Appleton, Wis., assignor to Kimberly-Clark Corporation, Neenah, Wis.
Filed Apr. 22, 1970, Ser. No. 30,811
Int. Cl. C08b 5/00; D06m 11/08, 13/26
U.S. Cl. 260—219
16 Claims

ABSTRACT OF THE DISCLOSURE

An improved highly absorbent fiber is obtained by phosphorylating cellulose pulp fibers. A preferred form of the product is obtained by chemically substituting phosphate groups for hydroxyls on the cellulose, hydrolytically degrading the fiber walls and then converting the partially substituted and hydrolyzed cellulose fibers to the salt form by ion exchange. Subsequent mechanical refining and solvent drying of the fibers results in a product having capillary suction forces significantly higher than conventional absorbent fiber materials.

BACKGROUND OF THE INVENTION

Phosphorylation of cellulose has been suggested in the past for the flameproofing of textile fabrics, and for use in paper to prepare ion exchange media for chromatographic purposes. However, in the studies associated with these developments there has been no indication of any unusual improvement in the absorption characteristics of the products obtained therefrom, nor has there been any suggestion that such products could be modified to make them especially useful for fluid absorption purposes.

This invention is directed to phosphorylated cellulose fibers which exhibit unusual and useful absorbent properties, and to a method for the preparation thereof.

SUMMARY OF THE INVENTION

Phosphorylated fibers in accordance with this invention are produced by first saturating cellulose pulp sheets in a phosphorylating bath preferably comprised of an aqueous solution of urea and phosphoric acid; drying, and then reacting or curing the saturated sheets at elevated temperature; dispersing the cured sheets in distilled water to obtain a dispersion of the phosphorylated fibers; washing the dispersed fibers thoroughly with distilled water; converting the dispersed fibers to the acid form by treatment with acid, preferably a hot acid solution; and converting the acidified fibers to the salt form by treatment with an alkaline solution. The resulting fibers are washed free of excess alkali with distilled water. To obtain maximum improvement in absorbent properties, the fibers are then subjected to mechanical refining. Finally the fibers are solvent dried to avoid interbonding of fibers. While the abovementioned mechanical refining improves considerably the already improved absorbent capabilities of the modified fibers over unmodified fibers, unrefined and solvent dried fibers themselves show sufficient improvement over unmodified fibers to be useful.

The fibers which result are characterized by a much higher moisture regain than unmodified fibers, and exhibit extremely high absorbent capacity when formed into mats. Such mats have the ability to exert exceptional capillary suction pressures in their dry state as well as after they have already absorbed substantial quantities of water.

This capacity for exerting high suction pressures even after significant fluid uptake make mats of phosphorylated fibers extremely useful as supplementary absorbent components, as for example when they are used as internal elements in the construction of sanitary napkins, catamenial tampons, diapers, multi-ply absorbent wipes, surgical sponges, and other absorbent devices.

These fiber mats also have the ability to retain fluid once it is absorbed. This tends to prevent absorbed fluid from being drained away by other materials which are in capillary contact therewith.

Another useful property is the ability of mats made from such fibers to rapidly spread absorbed fluid within the mat itself.

In converting the phosphorylated fibers to their ionized salt form, such as the sodium salt thereof, the alkali employed in this step is preferably a dilute solution of sodium hydroxide. However, solutions of other ion exchange chemicals such as sodium carbonate, sodium phosphate and the like may be used for the purpose. Although the sodium salt form of the phosphorylated fibers is preferred from a cost standpoint, other salt forms such as potassium or ammonium would also be suitable.

Phosphorylation of the pulp fibers may be accomplished by methods other than by using a solution of urea and phosphoric acid as set forth above, although the described urea phosphate method is preferred. Other known but less satisfactory methods for phosphorylating cellulose fibers include the use of phosphorous oxychloride and pyridine; phosphorous oxychloride and phosphoric acid; phosphorous oxychloride and dioxane; phosphorous oxychloride alone, and alkali metal salts of phosphoric acid.

The curing or reaction of the pulp treated with the phosphorylating solution is preferably done at a temperature of from about 130° to 195° C. for from about 5 minutes to over 30 minutes, although extending the time beyond 20 minutes results in only moderate improvement. The rate of reaction is somewhat dependent on the usual time-temperature relationship, so that long periods of aging at lower temperature could also produce the desired results.

For converting the phosphorylated fibers to acid form, cold acid may be used instead of hot acid as noted above. However, hot acid is preferred because it more readily hydrolyzes the fiber walls; permitting subsequent ballooning and gelling of the fibers which fosters enhanced capillary suction. The fibers may also be converted to the salt form without an intervening acid treatment, although the latter does improve final absorbency as indicated above.

Freeze drying may also be substituted for solvent drying in the final step to avoid interbonding and collapse of the fibers. For best results, it is preferred that the pulp fibers, which expand and swell during wet refining, retain an expanded state when dried. Ordinarily when a swelling liquid is removed from swollen cellulose fibers by evaporative drying the swollen structure collapses to its non-swollen state. Solvent drying minimizes such collapse. Freeze drying accomplishes this objective also, since in the freezing drying process water is removed in its frozen state by sublimation under vacuum. Mats of the freeze dried fibers also were found to have more resilience. Accordingly, the freeze drying method is preferred where added resilience is dictated by the end use.

In any event, the fibers should be dried by physical removal of the water by means other than evaporation. Ordinary evaporative drying from a wet state is not desirable since the resultant fibers form hydrogen bonds resulting in a horny, hard mass which doe not exhibit the desired improvement in absorbency characteristics to any significant degree even when mechanically reduced to fibers. In fact, in such form the fibers may be used in paper as a supplementary bonding agent.

Accordingly, it is a primary object of this invention to provide chemically modified cellulose fibers with markedly improved fluid absorbency characteristics.

Another object is to provide a suitable process for obtaining such fibers.

Other features, objects and advantages of the invention will become apparent by reference to the following specification and accompanying drawings.

DESCRIPTION OF THE PREFERRED EMBODIMENTS

Example 1

In a preferred embodiment, four sheets of unbeaten, bleached northern softwood kraft pulp weighing about 14 grams each were immersed for about 30 minutes in a bath consisting of 50% urea, 18% orthophosphoric acid, and 32% water by weight. The saturated pulp sheets were drained and pressed to a consistency of 1 part fiber to 3 parts by weight of solution. The moist sheets were dried and reacted or cured in an oven for 5 minutes at 160° C. The cured sheets were dispersed in deionized water and the resulting slurry washed free of the treating solution by several rinses with deionized water using a suction filter.

The filtered material was dispersed in a 3% solution of hot hydrochloric acid and soaked at a temperature of between 60° and 70° C. for ½ hour. This fiber, now in its acid form, was washed free of excess acid and converted to salt form by soaking in a 5% solution of $Na_2CO_3$ for ½ hour. After the fiber was washed again, it was refined in a conventional PFI laboratory refiner at 10% consistency for 2¼ minutes. The refined pulp was then solvent dried from acetone.

Figure 5:
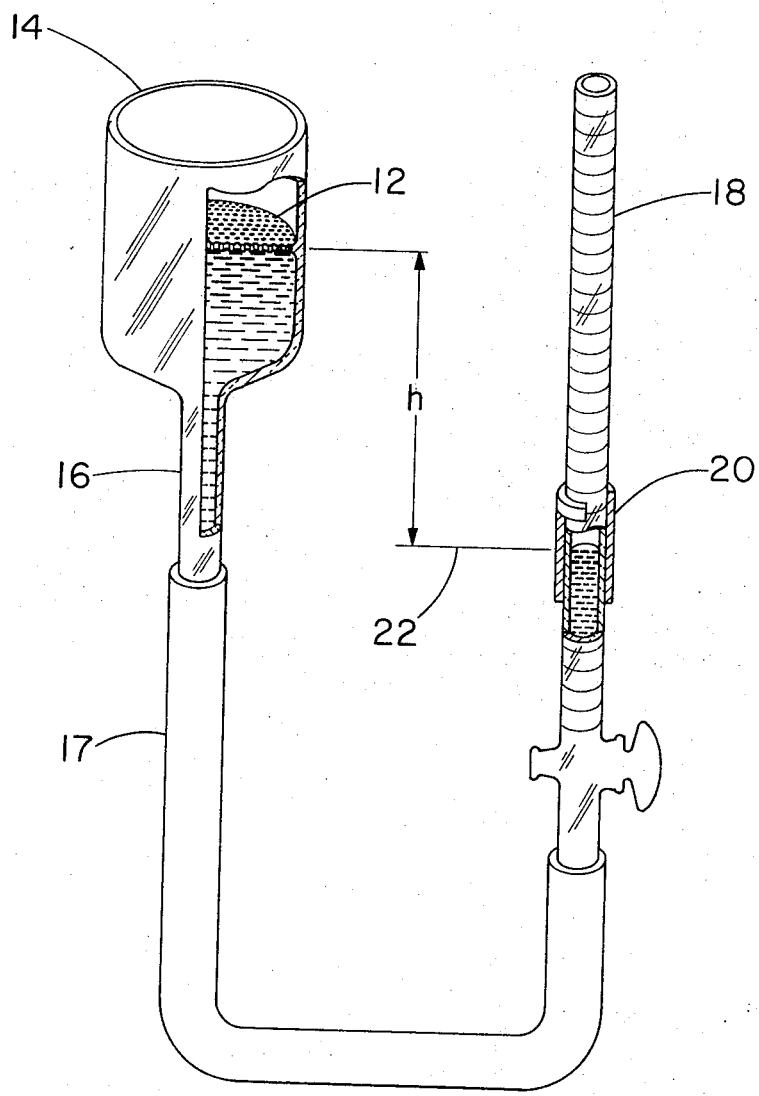
FIG. 5 is a representation partly in section, of the testing device used to define the absorbency characteristics of fibers described herein.

Mats made of fibers thus obtained were analyzed for absorption characteristics in terms of capillary suction pressure by means of a known capillary tension cell apparatus of the type shown in FIG. 5. This apparatus comprises a sintered glass fine frit filter plate 12 which is an integral part of glass funnel 14 connected by glass tube 16 to rubber hose 17 which is in turn connected to buret 18. Funnel 14 is attached to a conventional bench stand along with buret 18, which is disposed alongside funnel 14 as shown in the drawing, and held by clamp 20 which permits manual adjustment. When all connections have been made, the device is filled with water so that an uninterrupted air-free column of water extends from direct contact with the lower face of filter plate 12 through tubing 17 to the desired level of water 22 in buret 18. Water level 22 may be set at any predetermined hydrostatic head indicated as value $h$. This predetermined head is maintained substantially constant while testing any one sample by manually moving buret 18 upwardly in clamp 20 as water is absorbed by the sample. For purposes of testing the samples described herein and as shown on the accompanying charts (FIGS. 1–4) the predetermined pressures, or hydrostatic heads, used were 60, 40, 25, 15, 10 and 0 cm. of water.

The fiber sample tested in each case is in the form of an air laid mat 2½ inches in diameter and weighing about 0.7 gram air dry. The sample is placed on top of filter plate 12 and covered with a perforated nylon disc weighted to supply a light confining pressure of 0.09 p.s.i. on the mat. Distilled water having a surface tension of 72 dynes/cm. is used to fill the device. As the mat being tested draws water through filter plate 12 and water level 22 becomes lower, the hydrostatic head is maintained substantially constant by manually adjusting the buret to the predetermined pressure setting.

Equilibrium is achieved within 100 minutes and the volume of water absorbed is then recorded.

Figure 1:
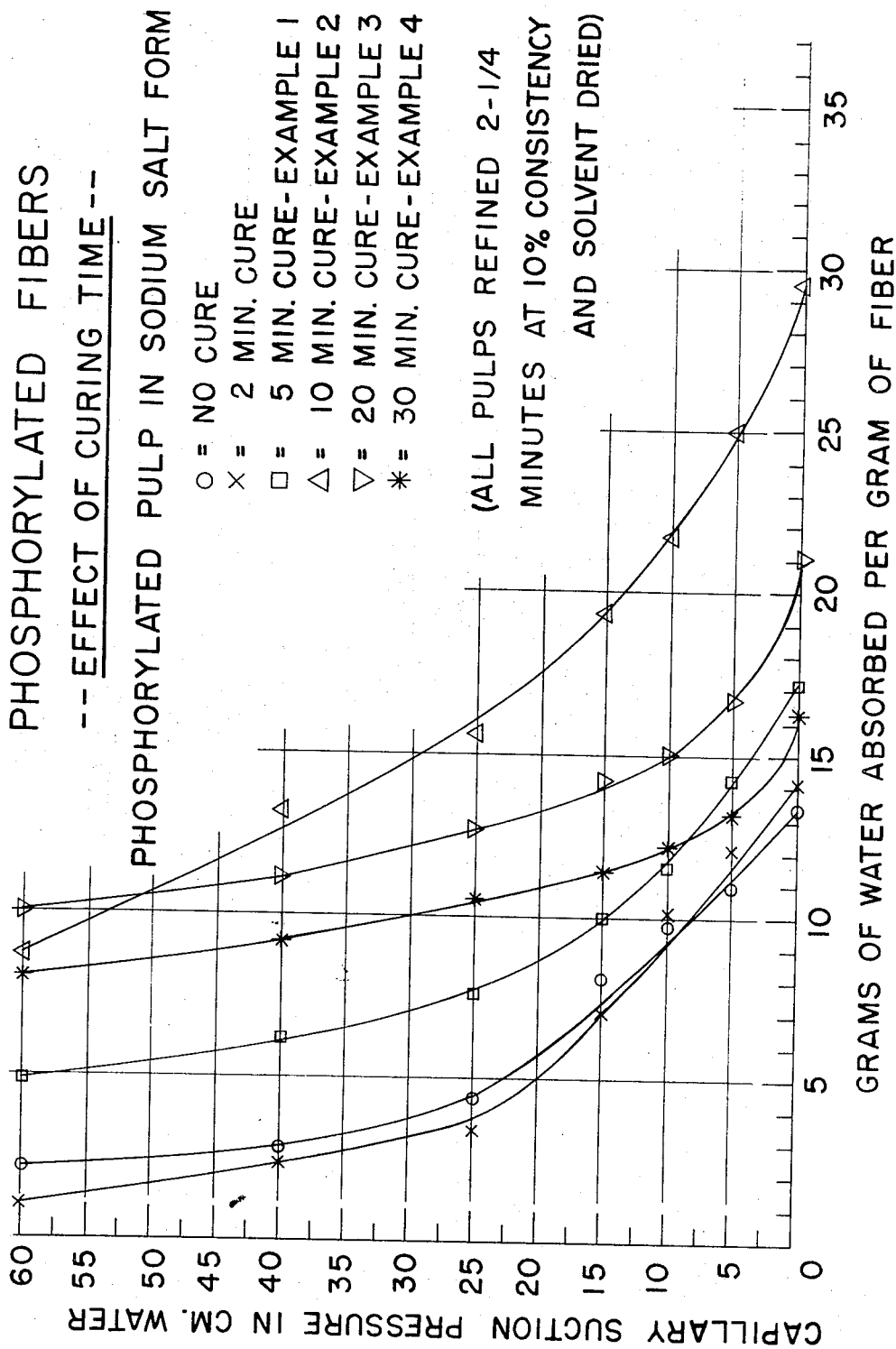
FIGS. 1–3 are graphs comparing absorbency values for various forms of fibers of this invention with each other and with unmodified fibers.
Figure 2:
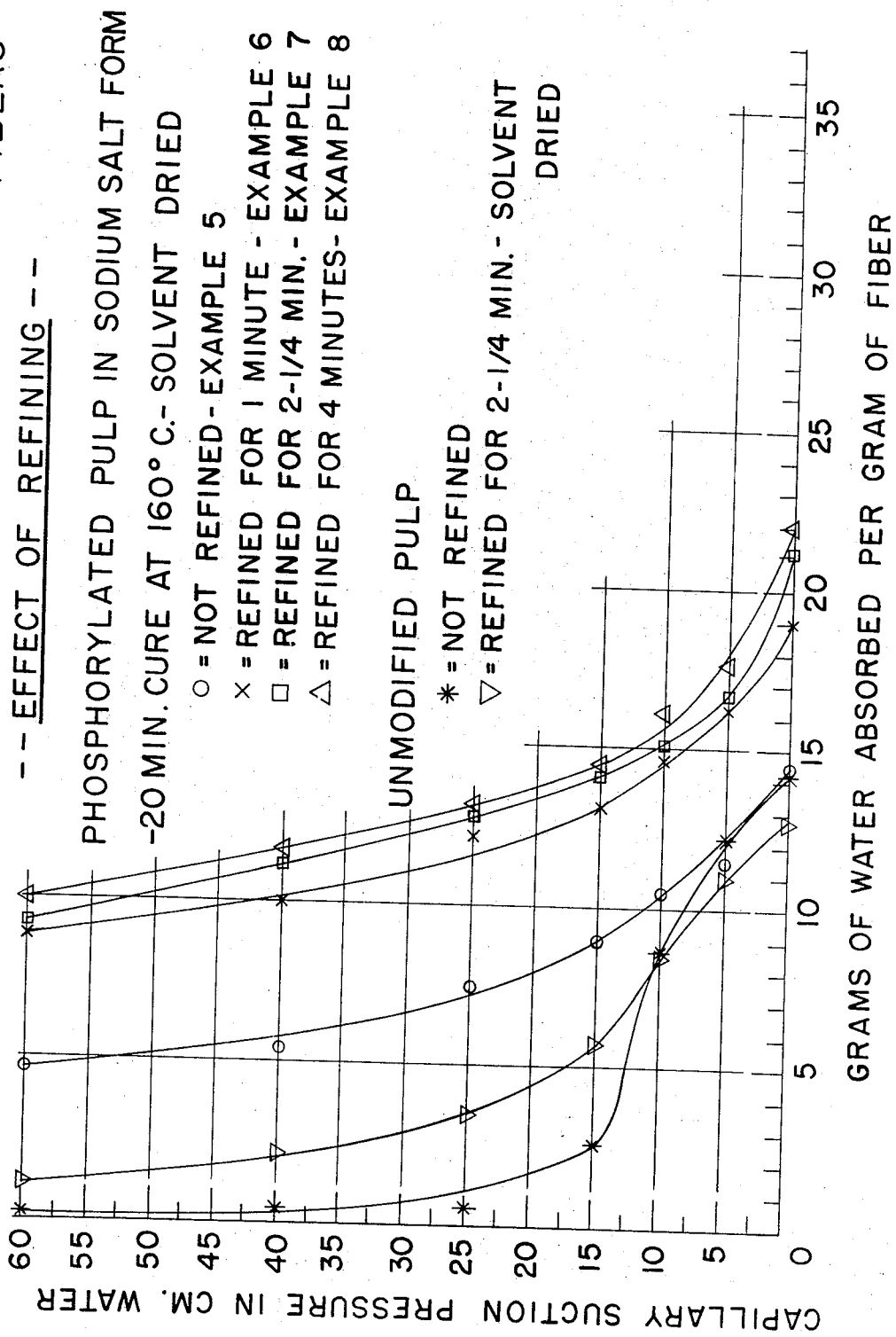

When a mat of fibers made from the Example 1 product was tested by this apparatus, it was found to exhibit a markedly improved absorbent capacity compared to unmodified pulp (see FIG. 1). The sample mat exerted a capillary suction pressure of 60 cm. of water at a moisture content of 5 grams of absorbed water per gram of fiber. At 10 grams absorbed $H_2O$/gm fiber, it still exerted 15 cm. of pressure, and arrived at zero suction pressure only after about 17 gms. of $H_2O$ were absorbed per gm. fiber. In contrast, a mat of untreated and unrefined wood pulp fluff at 5 grams of absorbed $H_2O$/gm. fiber exerted a suction pressure of only about 12 cm. of water, or ⅕ that of the phosphorylated pulp fibers of Example 1.

Example 2

In this example, the same conditions were used as in Example 1 except that the saturated pulp sheets were cured for 10 minutes at 160° C.

As noted in FIG. 1, this product had a higher absorbent capacity than the fibers of Example 1, exerting a capillary suction pressure of 60 cm. of water at 9 grams of absorbed water per gram of fiber; 40 cm. at 13 grams absorbed $H_2O$; and arriving at zero pressure only after 29.5 grams of $H_2O$ are absorbed.

Example 3

In this example, the same conditions were used as in Examples 1 and 2 except that the saturated pulp sheets were cured for 20 minutes at 160° C.

This product had the same high absorbent capacity at low moisture content as Example 2, but less at higher moisture content. The capillary pressures exerted were 60 cm. at 9 gms. $H_2O$; 25 cm. at 13 gms. $H_2O$, with zero pressure reached at 21 grams $H_2O$.

Example 4

In this example, the same conditions were used as in Examples 1, 2 and 3 except that the saturated pulp sheets were cured for 30 minutes at 160° C.

This product showed slightly lower absorbent capacity than Examples 2 and 3 at low moisture content, and still lower capacity at high moisture content. The suction pressures measured were 60 cm. at 8 gms. $H_2O$; 25 cm. at about 11 gms. $H_2O$; and zero was reached at about 16 gms. $H_2O$.

From the above, it may be concluded that curing time has an effect on final absorbency, with a curing time of between 10 and 20 minutes providing the best results. The various curves in FIG. 1 illustrate graphically this effect. It is noted that at a capillary suction pressure of 60 cm. of water, the phosphorylated fibers obtained when the treated pulp was cured from 5 to 20 minutes at 160° C. were capable of absorbing from about 5 to 10 grams of water per gram of fiber.

Examples 5, 6, 7, 8

Refining also appears to have an effect on absorbent capacity.

To test this, samples were prepared as in Example 3 (20 minutes curing at 160° C.), except that different refining times were used. Example 5 had no refining; Example 6 had one minute refining; Example 7 had 2¼ minutes refining; and Example 8 had 4 minutes refining.

Suction pressures for these examples were approximately as follows: (See FIG. 2 for representatives curves.)

TABLE I

Effect of Refining

| Example No. | Refining time in minutes | Moisture content grams of $H_2O$/gm. of fiber at indicated suction head | | |
|---|---|---|---|---|
| | | 60 cm. | 25 cm. | 0 cm. |
| Unmodified pulp | 0 | 0.2 | 0.6 | 14.3 |
| Do | 2¼ | 1.2 | 3.5 | 13 |
| 5 | 0 | 5 | 7.5 | 14.5 |
| 6 | 1 | 9 | 12 | 19 |
| 7 | 2¼ | 9 | 13 | 21 |
| 8 | 4 | 10 | 13 | 22 |

It is concluded from these latter results that refining serves to break up the primary wall of the phosphorylated fibers, which permits the treated fibers to swell and expand, especially when wet.

Microscopic examination of the fibers, before refining, indicated that the phosphorylated pulp fibers look very much like ordinary wood pulp fibers when wet except that the walls of the phosphorylated pulp showed signs of fraying and some ballooning in a number of places while the walls of the ordinary wood pulp fibers were substantially intact. However, the refined phosphorylated fibers in salt form exhibited considerable ballooning and swelling down the length of the fiber with only a few confining rings appearing where the fiber wall remained intact. In effect, a major portion of the primary wall of the individual fibers is peeled back to expose the fiber core except where a few confining rings appear. Refined unmodified pulp showed some fraying, but no ballooning or swelling.

Refining is, therefore, considered to be an important step in fiber preparation since the degree of swelling and ballooning obtained when the fiber walls are broken by this step apparently plays a vital role in the capillary suction pressure exerted by the fibers. This swelling and ballooning does not take place in refined, unmodified fibers.

Figure 3:
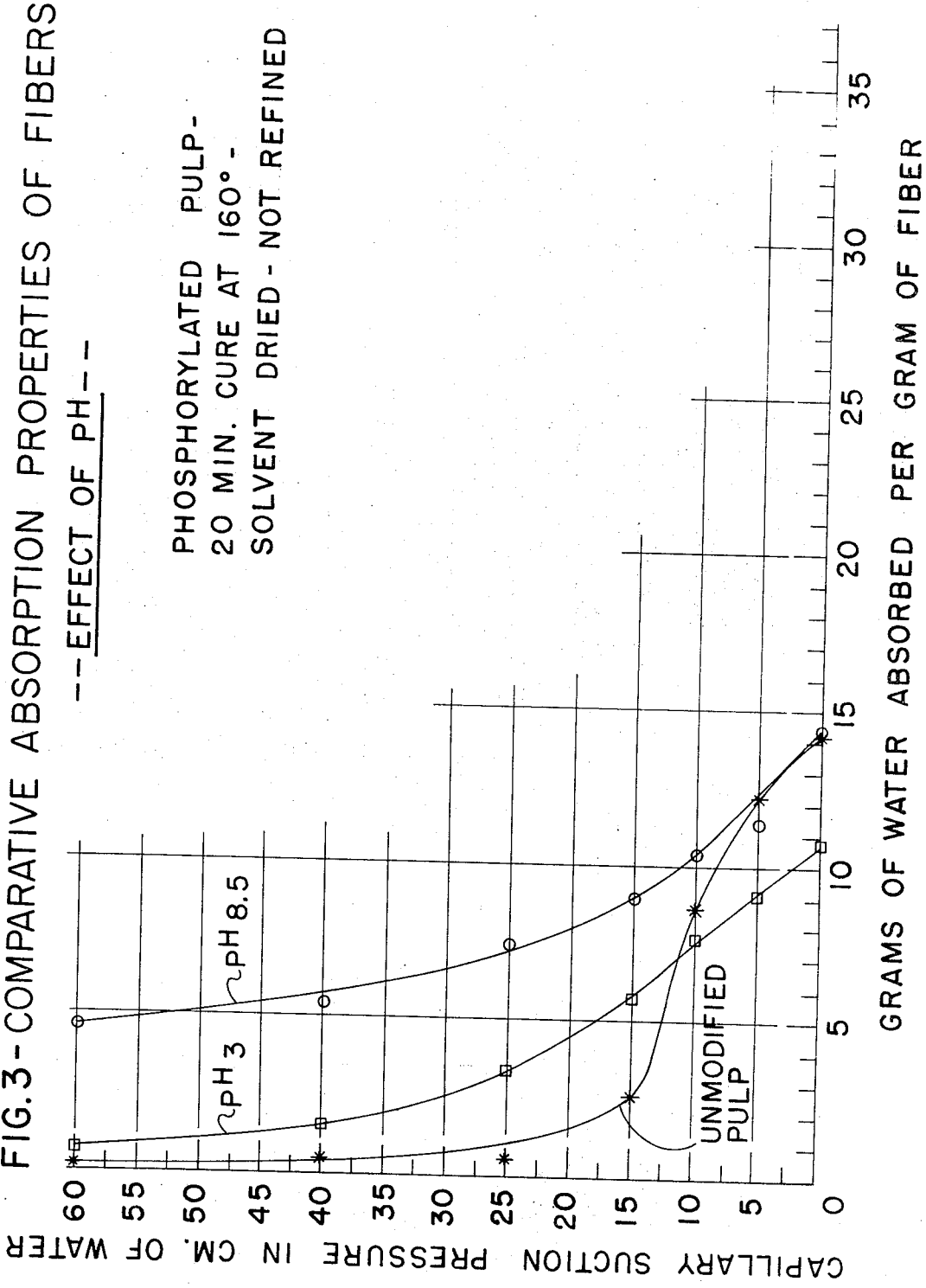
Figure 4:
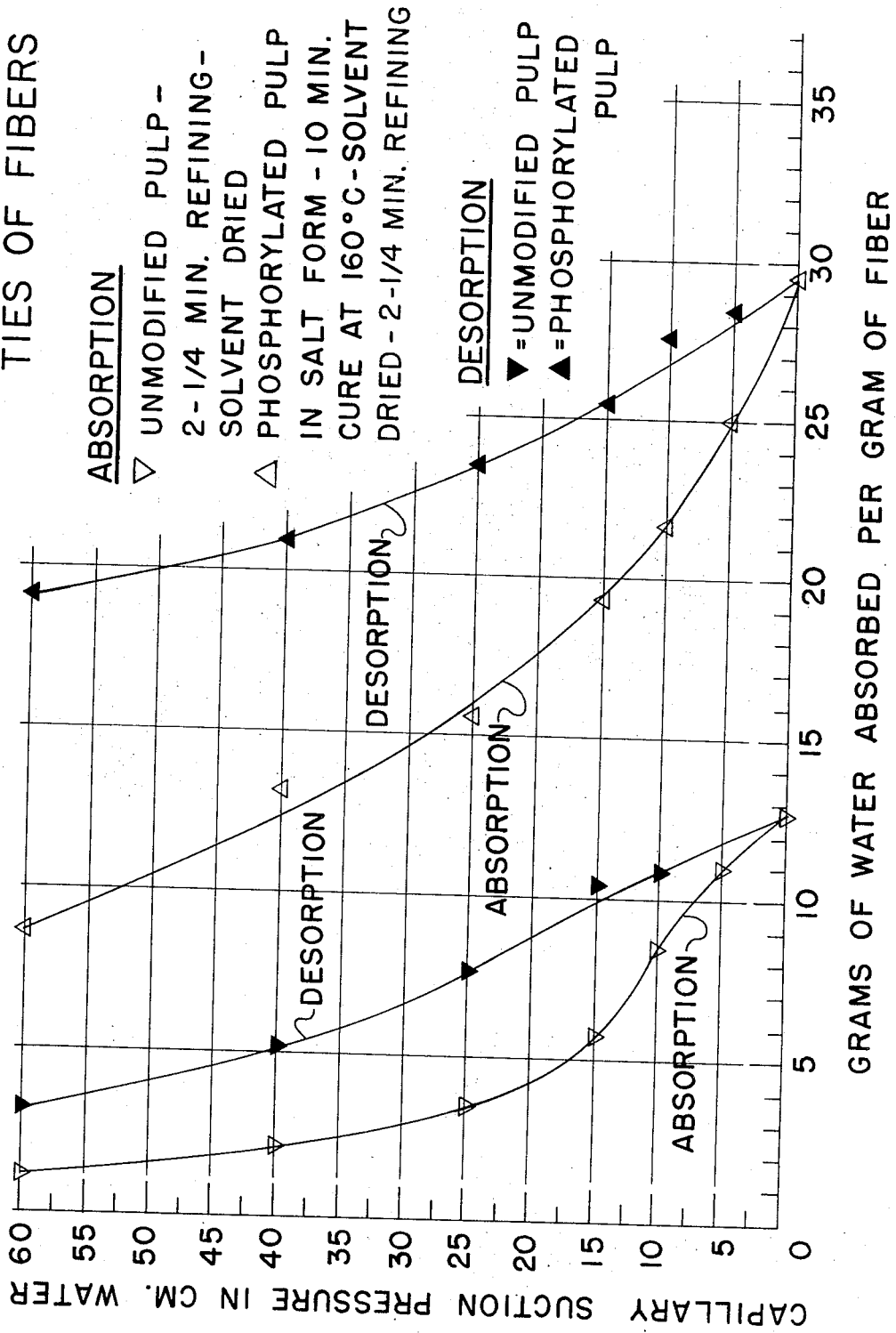
FIG. 4 is a graph comparing absorption-desorption values of one form of the fibers of this invention with unmodified fibers.

The effect of pH on absorbency was also studied (See FIG. 3). Samples were prepared as in Example 3 (20 minutes cure at 160° C.) except that Example 9 was left in acid form at a pH value of about 3 and Example 10 was converted to salt form with sodium carbonate and thoroughly washed. This product had a pH value of about 8.5. These fibers also were not refined. Values for unmodified, unrefined pulp are also entered for comparison purposes.

TABLE II

| Example No. | pH | Moisture content grams of $H_2O$/gm. of fiber at indicated suction head | | |
|---|---|---|---|---|
| | | 60 cm. | 25 cm. | 0 cm. |
| Unmodified pulp | | 0.2 | 0.6 | 14.3 |
| 9 | 3 | 0.8 | 3.5 | 11 |
| 10 | 8.5 | 4.7 | 7.5 | 14.5 |

From these latter tests, indications are that the phosphorylated fibers become more absorbent as the pH is raised, even before being refined..

The following additional comparisons in tabular form showing capillary pressures are also of interest.

For each of the following Tables, III and IV, the first column of figures indicates the capillary suction pressure that is generated by the fiber mats at a water content of 10 grams of water per gram of fiber; the second column shows the water absorbed in grams of water per gram of fiber against a 40 cm. hydrostatic head.

The figures in Table III show the effect of curing time on pulp in which the saturated pulp sheets have been cured at 160° C. for the various periods expressed in minutes as indicated. The resulting fibers were also refined for 2¼ minutes at 10% consistency and solvent dried.

TABLE III

Effect of Curing Time

| Curing time | Capillary pressure at 10 g. $H_2O$/g. fiber in cm. of $H_2O$ | Water absorbed g. of water/g. of fiber at 40 cm. of $H_2O$ pressure |
|---|---|---|
| Unmodified pulp | 7.0 | 2.1 |
| 0 minute | 6.5 | 2.9 |
| 2 minutes | 9.5 | 2.4 |
| 5 minutes | 15 | 6.3 |
| 10 minutes | 53 | 12.6 |
| 20 minutes | 52 | 11.2 |
| 30 minutes | 32 | 9.4 |

From these results, it is concluded that to obtain a significant improvement in absorption characteristics the saturated pulp sheets should be cured for more than 2 minutes. As indicated, the improvement in absorbent properties begins to show somewhere between 2 and 5 minutes of curing. A cure time in the range of about 10 to 20 minutes provides optimum absorption properties.

Table IV shows the effect of refining time on pulp cured at 160° for 20 minutes during phosphorylation. Refining is at 10% consistency and the products are solvent dried.

TABLE IV

Effect of Refining Time

| Refining time | Capillary suction pressure at 10 g. $H_2O$/g. fiber in cm. of $H_2O$ | Water absorbed, g. of $H_2O$/g. of fiber at 40 cm. of $H_2O$ pressure |
|---|---|---|
| Unmodified pulp | 7.0 | 2.1 |
| 0 minute | 11.5 | 5.7 |
| 1 minute | 42.5 | 10.2 |
| 2¼ minutes | 52 | 11.2 |
| 4 minutes | 60 | 11.6 |

These results indicate that while unrefined phosphorylated pulp shows significant improvement in absorption characteristics over unmodified pulp, greatly improved results are obtained if the phosphorylated pulp is refined for at least 1 minute.

As indicated earlier, mats of phosphorylated pulp fibers also have an improved ability to retain fluid once it has been absorbed. The absorption-desorption curves shown in FIG. 4 graphically illustrate this point. The absorption curves for the two examples shown are the same as previously shown and described. For the desorption curve, the capillary suction pressure was raised from 0 cm. back to 60 cm. of $H_2O$ at the various stages indicated and the grams of water retained at each level was then measured. The results were as follows:

TABLE V

Absorption-Desorption Properties

| Capillary suction pressure in cm. of $H_2O$ | Absorption, water content in gm. of $H_2O$/gm. of fiber | | Desorption, water content in gm. of $H_2O$/gm. of fiber | |
|---|---|---|---|---|
| | Unmod. pulp [1] | Phos. pulp [2] | Unmod. pulp [1] | Phos. pulp [2] |
| 60 | 1.1 | 8.7 | 3.3 | 19.3 |
| 40 | 2.1 | 13.3 | 5.3 | 21 |
| 25 | 3.5 | 15.7 | 7.8 | 23.6 |
| 15 | 5.8 | 19.4 | 10.5 | 25.4 |
| 10 | 8.5 | 21.8 | 10.9 | 27.6 |
| 5 | 11 | 25 | 11.7 | 28.5 |
| 0 | 13 | 29.5 | 13 | 29.5 |

[1] Unmodified pulp = Refined for 2¼ minutes, solvent dried.
[2] Phosphorylated pulp = 10 minute cure at 160°, 2¼ minute refining, solvent dried.

This table indicates that mats made from phosphorylated fibers have a much higher resistance to the drainage therefrom of absorbed fluid by capillary suction into adjacent absorbent layers of other fibrous mats than does unmodified pulp. This ability to tenaciously hold absorbed aqueous fluids makes phosphorylated fibers admirably suited for use as an internal element in absorbent pad structures where it can function as a better reservoir for absorbed fluid and add to the functional absorbent capacity, and hence the useful life, of such pads.

Another property which has been found to be useful in characterizing the improved absorptive properties of phosphorylated wood pulp is its ion exchange capacity.

Various forms of phosphorylated pulp as defined below were tested for ion exchange capacity by potentiometric titration with 0.1 N sodium hydroxide to determine their respective ion exchange capacities (IEC) in milliequivalents (meq.) per gram of dry fiber. The results also indicate the degree to which phosphate groups have been substituted for hydroxyls.

In the following table, the phosphorylated pulp samples selected were all cured at 160° C. for the times indicated, left in their acid form, and solvent dried.

The recorded results were as follows:

TABLE VI

Ion exchange capacities for phosphorylated pulp

| Curing time, minutes | Average ion exchange capacities meg./g. fiber |
|---|---|
| 0 | 0.2556 |
| 2 | 0.3089 |
| 5 | 1.3625 |
| 10 | 2.9842 |
| 20 | 4.9417 |
| 30 | 5.0143 |

By comparing these values to the various values for absorption previously given, it will be seen that the phosphorylated fibers with 0 and 2 minute cures have an extremely low IEC. Those with over 2 minute cures have a much higher IEC. The phosphorylated fibers made in accordance with this invention which are particularly useful in absorbent products therefore may be characterized by an IEC of from about 1 to over 5 meq./g. of fiber, with the preferred range appears to be from about 2.5 to 5.0 meq.

Still another characteristic which distinguishes phosphorylated fibers from other absorptive fibers is the percent moisture regain they exhibit. For example, carboxymethylated cellulose fibers in their salt form and having a degree of substitution less than about 0.3 have been found in the prior art to provide improved absorption characteristics over unmodified fibers. Phosphorylated pulp fibers in their salt form with a similar degree of substitution show a much greater absorptive power and this increase is also apparently reflected in the following table showing moisture regain for various fibers:

TABLE VII

Moisture regain at 50% relative humidity

| Fiber: | Percent regain |
|---|---|
| Untreated Wood Pulp | 6.4 |
| CMC (Salt), D.S.=0.19 | 8.85 |
| Phosphorylated, (Acid) D.S.=0.23 | 7.80 |
| Phosphorylated, (Salt) D.S.=0.23 | 15.70 |
| Phosphorylated, (Salt) D.S.=0.393 | 16.80 |

(The degree of substitution (D.S.) of the phosphorylated cellulose is calculated by assuming two available ion exchange equivalents per phosphate group.)

The indication is that fibers with a higher percent moisture regain have a greater affinity for moisture than fibers with lower regain.

Note again that the acid form of phosphorylated pulp does not show the improvement in moisture regain exhibited by the fibers in salt form. Note also that phosphorylated fiber with a degree of substitution higher than 0.3 shows a still higher increase in percent moisture regain when compared with the fibers having a lower degree of substitution.

Still another property of phosphorylated cellulose fiber which enhances its performance in absorbent products is its exceptional ability to spread and distribute aqueous fluids. Fibrous fluff made from ordinary wood pulp is a poor fluid distributor, tending to form a saturated island at the point where fluid is applied, surrounded by dry fiber. In fact, when saturated with water, a fluff mat of unmodified pulp fibers will transfer only about 20% of its fluid to an equivalent amount of dry fiber of the same type placed in capillary contact therewith. In contrast, a phosphorylated fiber fluff mat will transfer about 44% of its fluid content to an equivalent dry fiber layer of phosphorylated fiber fluff. This is approaching the theoretical maximum of 50%.

Comparison of fibers previously mentioned with respect to their ability to transfer fluids within batts made thereof may be found in the following table:

TABLE VIII

Fluid Transfer [1]

| Fiber | Wet, percent | Dry, percent | Pressure at equilibrium, cm. water |
|---|---|---|---|
| Unmodified pulp | 79.3 | 20.7 | 14.4 |
| CMC, salt form D.S.=0.107 | 65.8 | 34.2 | 15.0 |
| CMC, salt form D.S.=0.25 | 64.0 | 36.0 | 26.0 |
| Phosphorylated, acid form D.S.=0.23 | 65 | 35 | 19.2 |
| Phosphorylated, salt form D.S.=0.23 | 56.0 | 44.0 | 30.2 |
| Phosphorylated, salt form D.S.=0.393 | 57.50 | 42.5 | 29.9 |

[1] The percent refers to the percentage of the original water in the saturated wet mat either retained in the wet mat, or transferred to the dry mat at equilibrium, the weight of the dry fiber being the same in both mats. One method for measuring this may be found in Burgeni, A.A. and Kapur, C. "Capillary Sorption Equilibria in Fiber Masses," Textile Research Journal 37(5) pp. 356–366, May 1967.

This ability to distribute fluid within low density fiber fluff layers is a unique and highly desirable property for application in disposable diapers, absorbent hospital pads and sanitary napkins.

While the invention is particularly applicable to wood pulp fibers, and they are the preferred type because of their low cost and ready availability, it is also applicable to related cellulose fibers such as hemp, jute, esparto, cereal straws, flax, bagasse, bamboo, reeds, cotton linters, kenaf and the like.

As noted previously, mats made from the fibers of this invention may be advantageously employed as an internal element in devices used in the absorption of body fluids, where they act not only as a reservoir for absorbed fluids but as a distributing body which enables other fibers used in the structure to be utilized more effectively. Alternatively, the entire device may be comprised of these fibers or the fibers may be admixed or blended with other less absorbent fibers inasmuch as the presence of the phosphorylated fibers in any amount will afford improved properties in comparison with a device made entirely of non-phosphorylated fibers. For example, the phosphorylated fibers may be admixed with wood pulp fluff, absorbent cotton, cotton linters, rayon and the like. Synthetic fibers may also be added where a particular quality such as increased resilience is required, although this can be expected to adversely affect or offset some of the improvement in absorbent properties provided by the phosphorylated fibers.

What is claimed is:

1. A method for producing modified cellulose fibers of improved absorbency which comprises saturating cellulost pulp fibers with an aqueous phosphorylating solution; reacting the saturated pulp at elevated temperature to obtain phosphorylated cellulose fibers; washing said fibers free of reactant in water; converting said fibers to salt form with an alkali while said fibers are dispersed in said water; mechanically refining said dispersed fibers while in salt form; and drying said fibers by removing said water from said fibers in a manner which avoids inter-fiber bonding.

2. The method of claim 1 in which said phosphorylating solution is selected from the group consisting of a solution of (a) urea and phosphoric acid, (b) phosphorous oxychloride and pyridine, (c) phosphorous oxychloride and phosphoric acid, (d) phosphorous oxychloride and dioxane, (e) phosphorous oxychloride alone, and (f) alkali metal salts of phosphoric acid.

3. A method for producing modified cellulose fibers of improved absorbency which comprises saturating cellulose pulp fibers with an aqueous phosphorylating solution; reacting the saturated pulp at elevated temperature to obtain phosphorylated cellulose fibers; dispersing the reacted fibers in water and washing said fibers free of reactant; treating the washed fibers with acid to convert the fibers to acid form; treating the acidified fibers with an alkaline solution to convert said acidified fibers to salt form; mechanically refining said salt form fibers while dispersed in water; and drying said fibers by removing the water in a manner which avoids inter-fiber bonding.

4. The method of claim 3 in which said alkali is selected from the group consisting of sodium hydroxide, sodium carbonate, and sodium phosphate.

5. The method of claim 3 in which said reaction is carried out at a temperature of from about 130° to 195° C. for from about 5 to over 30 minutes.

6. The method of claim 3 in which said water is removed by solvent drying.

7. The method of claim 3 in which said water is removed by freeze drying.

8. The method of claim 3 in which said fibers are subjected to said refining for at least one minute.

9. The method of claim 3 in which said phosphorylating solution is selected from the group consisting of a solution of (a) urea and phosphoric acid, (b) phosphorous oxychloride and pyridine, (c) phosphorous oxychloride and phosphoric acid, (d) phosphorous oxychloride and dioxane, (e) phosphorous oxychloride alone, and (f) alkali metal salts of phosphoric acid.

10. The method of claim 3 in which said acid is hydrochloric acid.

11. The method of claim 10 in which said acid is hot.

12. A method for producing modified cellulose fibers of improved absorbency which comprises saturating cellulose pulp fibers with an aqueous phosphorylating solution; reacting the saturated pulp at elevated temperature to obtain phosphorylated cellulose fibers; washing said fibers free of reactant in water; converting said fibers to salt form with an alkali while said fibers are dispersed in said water; mechanically refining said dispersed fibers while in salt form; and drying said fibers by removing said water from said fibers in a manner which avoids inter-fiber bonding; said drying method including solvent drying and freeze drying.

13. A method for producing modified cellulose fibers of improved absorbency which comprises saturating cellulose pulp fibers with an aqueous phosphorylating solution; reacting the saturated pulp at elevated temperature to obtain phosphorylated cellulose fibers; dispersing the reacted fibers in water and washing said fibers free of reactant; treating the washed fibers with acid to convert the fibers to acid form; treating the acidified fibers with an alkaline solution to convert said acidified fibers to salt form; mechanically refining said salt form fibers while dispersed in water; and drying said fibers by removing the water in a manner which avoids interfiber bonding, said drying method including solvent drying and freeze drying.

14. Modified cellulose pulp fibers with markedly improved absorbency capabilities compared to unmodified fibers comprising phosphorylated cellulose fibers in salt form, said fibers having an ion exchange capacity of from about 1 to over 5 milliequivalents per gram of dry fiber; the structure of said fibers being such that a major portion of the primary wall of each fiber is in a peeled away condition and a major portion of the fiber core stands exposed enabling the phosphorylated cellulose core to expand freely when wetted, said peeled away condition of the primary wall having been obtained substantially by mechanically refining said fibers while said fibers are in salt form.

15. The product of claim 14 in which said salt form is selected from the group consisting of sodium, potassium and ammonium.

16. An absorbent mat comprised of the fibers of claim 14, the fibers in said mat having substantially no hydrogen bonds with each other, said mat being characterized by the capability of absorbing from about 5 to 10 grams of water per gram of fiber at a capillary suction pressure of about 60 cm. of water.

References Cited

UNITED STATES PATENTS

| | | | |
|---|---|---|---|
| 3,052,593 | 9/1962 | Battista | 260—212 |
| 3,116,199 | 12/1963 | Cruz et al. | 162—157 |
| 3,388,119 | 6/1968 | Cruz | 260—212 |
| 3,423,284 | 1/1969 | Marek et al. | 162—157 |

FOREIGN PATENTS

| | | | |
|---|---|---|---|
| 838,973 | 6/1960 | Great Britain | 260—219 |
| 899,284 | 6/1960 | Great Britain | 260—219 |

OTHER REFERENCES

Industrial and Engineering Chemistry, volume 41, issue 12, pp. 2828–2834, December 1949.

DONALD E. CZAJA, Primary Examiner

R. W. GRIFFIN, Assistant Examiner

U.S. Cl. X.R.

8—116; 162—157 C